United States Patent
Zhou et al.

(10) Patent No.: US 10,906,343 B2
(45) Date of Patent: Feb. 2, 2021

(54) FABRIC PRINT MEDIA

(71) Applicant: Hewlett-Packard Development Company, L.P., Fort Collins, CO (US)

(72) Inventors: Xiaoqi Zhou, San Diego, CA (US); Francois K. Pirayesh, San Diego, CA (US); Silke Courtenay, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 91 days.

(21) Appl. No.: 16/069,815

(22) PCT Filed: May 12, 2016

(86) PCT No.: PCT/US2016/032197
§ 371 (c)(1),
(2) Date: Jul. 12, 2018

(87) PCT Pub. No.: WO2017/196354
PCT Pub. Date: Nov. 16, 2017

(65) Prior Publication Data
US 2019/0032275 A1    Jan. 31, 2019

(51) Int. Cl.
*B41M 5/50* (2006.01)
*B32B 27/20* (2006.01)
(Continued)

(52) U.S. Cl.
CPC ............ *B41M 5/506* (2013.01); *B32B 27/12* (2013.01); *B32B 27/20* (2013.01); *B41M 5/502* (2013.01);
(Continued)

(58) Field of Classification Search
CPC ........ C04B 20/10; C04B 20/12; B41M 5/502; B41M 5/506; B41M 5/508; B41M 5/5218;
(Continued)

(56) References Cited

U.S. PATENT DOCUMENTS 6,001,137 A    12/1999  Alfekri et al.
6,207,349 B1    3/2001  Lewis
(Continued)

FOREIGN PATENT DOCUMENTS

WO    2015041666    3/2015

OTHER PUBLICATIONS

International Search Report dated Jan. 10, 2017 for PCT/US2016/032197, Applicant Hewlett-Packard Development Company, L.P.

*Primary Examiner* — Betelhem Shewareged
(74) *Attorney, Agent, or Firm* — Thorpe North & Western LLP (57) ABSTRACT

The present disclosure is drawn to a fabric print medium including a fabric substrate, a primary coating layer, and a secondary coating layer. The fabric substrate can have a first side and a second side. The primary coating layer can be applied to the first side of the fabric substrate at a thickness from 2 μm to 250 μm with a dry coat weight ranging from about 5 gsm to about 300 gsm and can include a polymeric binder and filler particles. The secondary coating layer can be applied to the primary coating layer at a thickness from 1 μm to 50 μm with a dry coat weight ranging from 0.5 gsm to 50 gsm and can include a first crosslinked polymeric network and a second crosslinked polymeric network. The primary coating layer can be two or more times thicker than the secondary coating layer.

18 Claims, 3 Drawing Sheets

(51) Int. Cl.
  *B32B 27/12* (2006.01)
  *B41M 5/52* (2006.01)
(52) U.S. Cl.
  CPC .......... *B41M 5/508* (2013.01); *B41M 5/5272* (2013.01); *B41M 5/5254* (2013.01); *B41M 5/5281* (2013.01)
(58) Field of Classification Search
  CPC . B41M 5/5254; B41M 5/5272; B41M 5/5281
  USPC ...................................................... 428/32.16
  See application file for complete search history.

(56) References Cited

U.S. PATENT DOCUMENTS

| | | | |
|---|---|---|---|
| 6,478,980 B2 | 11/2002 | Nigam | |
| 6,589,633 B1 | 7/2003 | Ino et al. | |
| 8,133,556 B2 | 3/2012 | Klemann | |
| 2003/0019373 A1 | 1/2003 | Jordan | |
| 2003/0157303 A1 | 8/2003 | Li et al. | |
| 2004/0209010 A1* | 10/2004 | Cuch | B41M 5/52 428/32.24 |
| 2005/0245156 A1 | 11/2005 | Cates et al. | |
| 2006/0281849 A1 | 12/2006 | Johnson | |
| 2008/0081160 A1 | 4/2008 | Anderle et al. | |
| 2009/0011200 A1 | 1/2009 | Souma et al. | |
| 2009/0208675 A1 | 8/2009 | Nigam | |
| 2011/0008542 A1* | 1/2011 | Zeng | B41M 5/502 427/288 |
| 2011/0102497 A1 | 5/2011 | Sato et al. | |
| 2013/0032048 A1 | 2/2013 | Falcon | |
| 2015/0118419 A1* | 4/2015 | Zhou | B41M 5/5227 428/32.16 |
| 2016/0059606 A1 | 3/2016 | Zhou et al. | |
| 2019/0032275 A1* | 1/2019 | Zhou | C09K 21/08 |

* cited by examiner

FABRIC PRINT MEDIA

BACKGROUND

Textile printing has various applications including the creation of signs, banners, artwork, apparel, wall coverings, window coverings, upholstery, pillows, blankets, flags, tote bags, etc. It is a growing and evolving area and is becoming a trend in the visual communication market. As the area of textile printing continues to grow and evolve, the demand for new print mediums increases.

DETAILED DESCRIPTION

Despite the wide variety of applications, textile printing can be challenging due to the nature of textiles. Some textiles can be highly absorptive resulting in diminished color, and other textiles such as polymeric based textile materials can have low ink absorption resulting in color bleed. There can also be challenges associated with the durability of printed images, the softness of the printed textiles, and flammability. Accordingly, a coating composite that can be applied to a textile prior to printing that provides a smooth printing surface, is durable, soft, and/or flame resistant would be desirable.

In one example, the present disclosure is drawn to a fabric print medium. The fabric print medium can include a fabric substrate, a primary coating layer, and a secondary coating layer. The fabric substrate can have a first side and a second side. The primary coating layer can be applied to the first side of the fabric substrate at a thickness from 2 µm to 250 µm with a dry coat weight ranging from about 5 gsm to about 300 gsm. The primary coating layer can include a polymeric binder and filler particles. The secondary coating layer can be applied to the primary coating layer at a thickness from 1 µm to 50 µm with a dry coat weight ranging from 0.5 gsm to 50 gsm. The secondary coating layer can include a first crosslinked polymeric network and a second crosslinked polymeric network. The primary coating layer can be two or more times thicker than the secondary coating layer.

In another example, a method of preparing a fabric print medium is presented. The method can include applying a primary coating composition to a surface of a fabric to form a primary coating layer and applying a secondary coating composition to the primary coating layer to form a secondary coating layer. The primary coating layer can include a polymeric binder and filler particles and the composition used to form the layer can have a viscosity ranging from about 1,000 cps to about 50,000 cps, e.g., the viscosity of the composition can be as measured at room temperature at a speed of 100 rpm by a Brookfield viscometer. The secondary coating layer can include a first crosslinked polymeric network and a second crosslinked polymeric network.

In yet another example, a fabric print medium with two printing sides is presented. The fabric print medium can include a fabric substrate, primary coating layers, and secondary coating layers. Thus, the fabric substrate can have a first side and a second side with these layers independently applied to both sides. The primary coating layers can be applied to the first side and the second side of the fabric substrate at an independent thickness from 2 µm to 250 µm with an independent dry coat weight ranging from about 5 gsm to about 300 gsm. The primary coating layers can independently include a polymeric binder and filler particles. The secondary coating layers can be applied to the primary coating layer on both the first side and the second side at an independent thickness from 1 µm to 50 µm with an independent dry coat weight ranging from 0.5 gsm to 50 gsm. The secondary coating layers can independently include a first crosslinked polymeric network and a second crosslinked polymeric network. The primary coating layers can be two or more times thicker than their respective immediately adjacent secondary coating layer. The term "independently" is used in this example to indicate that though both sides have the same general parameters, the respective layers on each side does not need to be identical.

Figure 1:
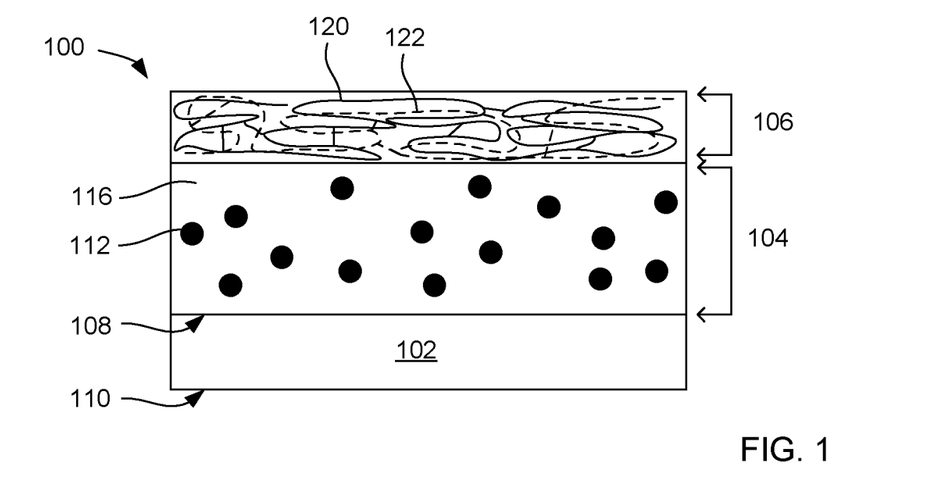
FIG. 1 schematically displays a side view of an example fabric print medium in accordance with the present disclosure.

Referring now to the FIGS., in FIG. 1, a fabric print medium 100 can include a fabric substrate 102, a primary coating layer 104, and a secondary coating layer 106. The fabric substrate can have a first side 108 and a second side 110. The primary coating layer can include a polymeric binder 116 and filler particles 112. The secondary coating layer can include a first crosslinked network 120 and a second crosslinked network 122.

Figure 2:
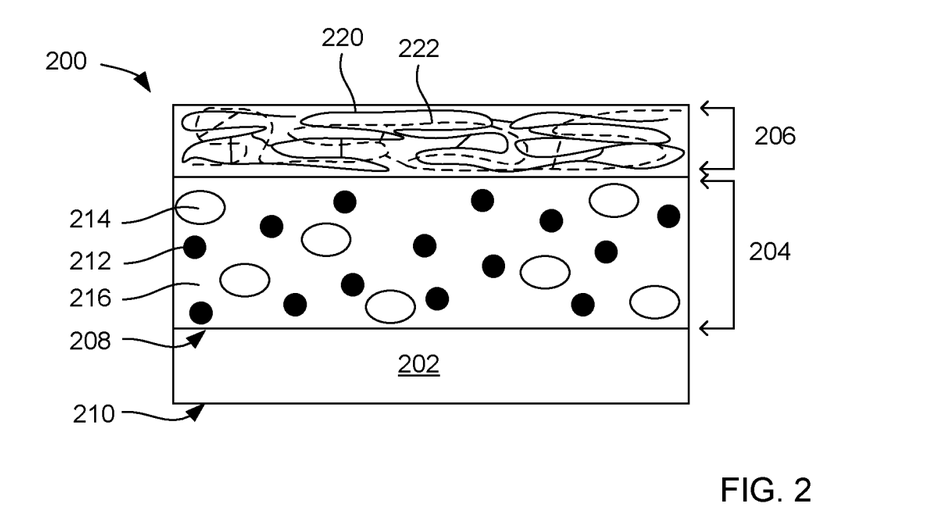
FIG. 2 schematically displays a side view of an example fabric print medium in accordance with the present disclosure.

Schematically FIG. 2 displays an alternative example of a fabric print medium 200, which can include a fabric substrate 202, a primary coating layer 204, and a secondary coating layer 206. The fabric substrate can have a first side 208 and a second side 210. The primary coating layer can include a polymeric binder 216, filler particles 212, and air voids 214 within the primary coating layer. Whether the primary coating layer has air voids, as shown in FIG. 2, or is devoid of air voids, as shown in FIG. 1, e.g., where the coating layer may be subsequently defoamed before applying it onto the fabric substrate, in either case, methods that can be used to apply the primary coating layer can include direct roll coating rods, such as, knife coating (floating knife), direct coating, calender coating, or padding coating, for example. Additionally, as with FIG. 1, FIG. 2 shows the secondary coating layer which includes a first crosslinked network 220 and a second crosslinked network 222.

Referring now more specifically to the fabric substrate. The fabric substrate can include a textile, fiber, fabric material, cloth, or other fabric structure. In one example, the fabric substrate can include a textile in its filament form. In another example, the fabric substrate can include a textile that has been crafted into a woven, non-woven, knitted, or tufted article, either in a raw material form or in a finished article form. Thus, the fabric can be a woven, non-woven, knitted, and/or tufted material and can include natural and/or synthetic fibers. In one example, the fabric substrate can have a warp and weft. Warp and weft fibers/yarns, for example, can be mutually positioned at an angle of about 90°. In another example, the woven fabric can be a fabric having a plain weave structure, a twill weave structure, a satin weave structure, or a combination thereof. In yet another example, the fabric substrate can include computer generated interlacing. In a further example, the fabric substrate can be a pile fabric.

As mentioned, the fabric substrate can include natural fibers. Exemplary natural fibers can include wool, cotton, silk, linen, jute, flax, hemp, rayon, thermoplastic aliphatic polymeric fibers derived from renewable sources, or combination thereof. Thermoplastic aliphatic polymeric fibers derived from renewable sources can include fibers derived from corn starch, tapioca products, sugarcane, or combination thereof. In some examples, the fabric substrate can include two, three, four, or more kinds of natural fibers. In one example, the fabric substrate can be silk. In another example, the fabric substrate can be cotton. In yet another example, the fabric substrate can be rayon.

The amount of natural fiber in the fabric substrate can vary. In one example, the amount of natural fiber can range from about 0 wt % to about 100 wt % of the fabric substrate. In another example, the amount of natural fibers can range from about 10 wt % to about 80 wt %. In yet another example, the amount of natural fibers can range from about 25 wt % to about 75 wt %. In one example, the amount of natural fibers can be about 10 wt % of the fabric substrate.

The fabric substrate can include synthetic fibers. Exemplary synthetic fibers can include polyvinyl chloride, polyester, polyamide, polyimide, polyacrylic, polypropylene, polyethylene, polyurethane, polystyrene, polyaramid (Kevlar®, DuPont™, USA), polytetrafluoroethylene (Teflon®, DuPont™, USA), fiberglass, polytrimethylene, polycarbonate, polyethylene terephthalate, polyester terephthalate, polybutylene terephthalate, copolymers, or combination thereof. In some examples, the fabric substrate can include two, three, four, or more kinds of synthetic fibers. In one example, the fabric substrate can be polyethylene terephthalate. In another example, the fabric substrate can be a polyester. In yet another example, the fabric substrate can be a polyester terephthalate.

The amount of synthetic fiber in the fabric substrate can vary. In one example, the amount of synthetic fibers can range from about 0 wt % to about 100 wt % of the fabric substrate. In another example, the amount of synthetic fibers can range from about 20 wt % to about 90 wt % of the fabric substrate. In yet another example, the amount of synthetic fibers can range from about 25 wt % to about 75 wt % of the fabric substrate. In one example, the amount of synthetic fibers can be about 90 wt % of the fabric substrate.

In one example, the fabric substrate can include wool, cotton, silk, linen, jute, flax, hemp, rayon, corn starch, tapioca, sugarcane, polyvinyl chloride, polyester, polyamide, polyimide, polyacrylic, polyacrylic polypropylene, polyethylene, polyurethane, polystyrene, polyaramid, polytetrafluoroethylene, polyethylene terephthalate, fiberglass, polytrimethylene, polycarbonate, polyester terephthalate, polybutylene terephthalate, or a combination thereof.

The natural and/or synthetic fibers can be treated. In one example, the fibers can include an additive. Exemplary additives can include colorants e.g., pigments, dyes, and/or tints, antistatic agents, brightening agents, nucleating agents, antioxidants, U.V. stabilizers, fillers, lubricants, or combination thereof.

In some examples, the synthetic fiber can be designed to include properties that may be beneficial for specific applications. In one example, the synthetic fiber based fabric can be a "PVC free" fabric. PVC free fabrics can include fabrics that do not contain polyvinyl chloride or vinyl chloride monomer units in the substrates. In some examples, the synthetic fiber can be a modified fiber. Modified fibers are fibers that have undergone a chemical and/or physical process in order to change the properties of the fiber. Exemplary processes can include copolymerization, chemical grafting of a functional group, plasma treatment, solvent treatment e.g., acid etching, and biological treatments e.g., enzyme or antimicrobial treatments.

In some examples, the fabric substrate can further include a fabric liner. The fabric liner can have the same structure or can have a different structure from the fabric substrate. In one example, the fabric liner can be a woven, non-woven, knitted, and/or a tufted structure. In one example, the fabric liner can be a knitted fabric with a loop structure including a warp-knit fabric, weft-knit fabric, or a combination thereof. The fabric liner can also include the same or similar materials or can have different materials from the fabric substrate. Again, the fabric liner can include natural fiber, synthetic fiber, or a combination of both. In some examples, the fabric liner includes two, three, four, or more fiber types. The fabric liner can further include additives, be designed to include the desirable properties, and/or be modified by the treatments identified above.

The basis weight of the fabric substrate can vary based on the composition of substrate. In one example, the fabric substrate can range from about 50 gsm to about 400 gsm. In another example, the fabric substrate can range from about 100 gsm to about 300 gsm. In yet another example, the fabric substrate can range from about 50 gsm to about 250 gsm. In a further example, the fabric substrate can range from about 250 gsm to about 400 gsm.

Turning now more specifically to the primary coating layer, this layer can include a polymeric binder and filler particles, and in some examples, can include air voids generated by foaming air bubbles into the coating composition for application as a layer. In some examples, the primary coating layer can also further include a flame retardant, and/or other processing aids, e.g., pH adjuster.

In some examples, the polymeric binder can be cross-linked. A crossed-linked polymeric binder can refer to a single polymeric substance or multiple polymeric substances with reactive functional groups that can form bonds between a molecular chain structure of the polymeric binder and/or a cross-linker. In some examples, the polymeric binder can be a self-crosslinking binder. Self-crosslinking binders can include different reactive functional groups that can bind to one another.

The polymeric binder can include a polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, polystyrene-butadiene emulsion, acrylonitrile butadiene latex, starch, gelatin, casein, soy protein polymer, carboxymethyl cellulose, hydroxyethyl cellulose, acrylic emulsion, vinyl acetate emulsion, vinylidene chloride emulsion, polyester emulsion, polyvinyl pyrroilidene, polyvinyl alcohol, styrene butadiene emulsion, derivatives thereof, or combination thereof. In one example, the polymeric binder can include starch and the starch can be an oxidized starch, cationized starch, esterified starch, enzymatically denatured starch, or combination thereof. In another example, the polymeric binder can be a soybean protein. In yet another example, the polymeric binder can include polyvinyl alcohol. Exemplary PVA's can include Kuraray Poval® 235, Mowiol® 6-98, Mowiol® 40-88, and Mowiol® 20-98 (all available from Kurary America Inc., Houston Tex.). In a further example, the polymeric binder can include an acrylonitrile-butadiene latex.

In one example, the polymeric binder can include a polyacrylate. The polyacrylate can be formed by polymers made by hydrophobic addition monomers, $C_1$ to $C_{12}$ alkyl acrylate and methacrylates (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl arylate, methyl methacrylate, ethyl methacrylate, n-propyl methacrylate, isopropyl methacrylate, n-butyl methacrylate, isobutyl methacrylate, sec-butyl methacrylate, tert-butyl methacrylate), aromatic monomers (e.g., styrene, phenyl methacrylate, o-tolyl methacrylate, m-tolyl methacrylate, p-tolyl methacrylate, benzyl methacrylate), hydroxyl containing monomers (e.g., hydroxyethylacrylate, hydroxyethylmthacrylate), carboxylic containing monomers (e.g., acrylic acid, methacrylic acid), vinyl ester monomers (e.g., vinyl acetate, vinyl propionate, vinylbenzoate, vinylpivalate, vinyl-2-ethylhexanoate, vinylversatate), vinyl benzene monomers, $C_1$ to $C_{12}$ alkyl acrylamide and methacrylamide (e.g., t-butyl acrylamide, sec-butyl acrylamide, N,N-dimethylacrylamide), crosslinking monomers (e.g., divinyl benzene, ethyleneglycoldimethacrylate, bis(acryloylamido)methylene), polymers created from the polymerization and/or copolymerization of alkyl acrylate, alkyl methacrylate, vinyl esters, styrene derivatives, or combination thereof.

In one example, a polyacrylate based polymer can include polymers having a glass transition temperature greater than 20° C. In another example, the polyacrylate based polymer can include polymers having a glass transition temperature of greater than 40° C. In yet another example, the polyacrylate based polymer can include polymers having a glass transition temperature of greater than 50° C.

In one example, the polymeric binder can include a polyurethane polymer. The polyurethane polymer can be hydrophilic. The polyurethane can be formed in one example by reacting an isocyanate with a polyol. Exemplary isocyanates used to form the polyurethane polymer can include toluenediisocyanate, 1,6-hexamethylenediisocyanate, diphenylmethanediisocyanate, 1,3-bis(isocyanatemethyl)cyclohexane, 1,4-cyclohexyldiisocyanate, p-phenylenediisocyanate, 2,2,4(2,4,4)-trimethylhexamethylenediisocyanate, 4,4'-dicychlohexylmethanediisocyanate, 3,3'-dimethyldiphenyl, 4,4'-diisocyanate, m-xylenediisocyanate, tetramethylxylenediisocyanate, 1,5-naphthalenediisocyanate, dimethyltriphenylmethanetetraisocyanate, triphenylmethanetriisocyanate, tris(isocyanatephenyl) thiophosphate, or combination thereof. Commercially available isocyanates can include Rhodocoat™ WT 2102 (available from Rhodia AG, Germany), Basonat® LR 8878 (available from BASF Corporation, N. America), Desmodur® DA, and Bayhydur® 3100 (Desmodur and Bayhydur available from Bayer AG, Germany). In some examples, the isocyanate can be protected from water. Exemplary polyols can include 1,4-butanediol; 1,3-propanediol; 1,2-ethanediol; 1,2-propanediol; 1,6-hexanediol; 2-methyl-1,3-propanediol; 2,2-dimethyl-1,3-propanediol; neopentyl glycol; cyclohexanedimethanol; 1,2,3-propanetriol; 2-ethyl-2-hydroxymethyl-1,3-propanediol; or combination thereof. In some examples, the isocyanate and the polyol can have less than three functional end groups per molecule. In another example, the isocyanate and the polyol can have less than five functional end groups per molecule. In yet another example, the polyurethane can be formed from a polyisocyanate having two or more isocyanate functionalities and a polyol having two or more hydroxyl or amine groups. Exemplary polyisocyanates can include diisocyanate monomers and oligomers.

In one example, the polyurethane prepolymer can be prepared with a NCO/OH ratio from about 1.2 to about 2.2. In another example, the polyurethane prepolymer can be prepared with a NCO/OH ratio from about 1.4 to about 2.0. In yet another example, the polyurethane prepolymer can be prepared using an NCO/OH ratio from about 1.6 to about 1.8.

In one example, the weight average molecular weight of the polyurethane prepolymer can range from about 20,000 Mw to about 200,000 Mw as measured by gel permeation chromatography. In another example, the weight average molecular weight of the polyurethane prepolymer can range from about 40,000 Mw to about 180,000 Mw as measured by gel permeation chromatography. In yet another example, the weight average molecular weight of the polyurethane prepolymer can range from about 60,000 Mw to about 140,000 Mw as measured by gel permeation chromatography.

Exemplary polyurethane polymers can include polyester based polyurethanes, U910, U938 U2101 and U420; polyether based polyurethane, U205, U410, U500 and U400N; polycarbonate based polyurethanes, U930, U933, U915 and U911; castor oil based polyurethane, CUR21, CUR69, CUR99 and CUR991; or combination thereof. (All of these polyurethanes are available from Alberdingk Boley Inc., North Carolina).

In some examples, the polyurethane can be aliphatic or aromatic. In one example, the polyurethane can include an aromatic polyether polyurethane, an aliphatic polyether polyurethane, an aromatic polyester polyurethane, an aliphatic polyester polyurethane, an aromatic polycaprolactam polyurethane, an aliphatic polycaprolactam polyurethane, or a combination thereof. In another example, the polyurethane can include an aromatic polyether polyurethane, an aliphatic polyether polyurethane, an aromatic polyester polyurethane, an aliphatic polyester polyurethane, or a combination thereof. Exemplary commercially-available examples of these polyurethanes can include; NeoPac® R-9000, R-9699, and R-9030 (available from Zeneca Resins, Ohio), Printrite™ DP376 and Sancure® AU4010 (available from Lubrizol Advanced Materials, Inc., Ohio), and Hybridur® 570 (available from Air Products and Chemicals Inc., Pennsylvania), Sancure®2710, Avalure® UR445 (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer"), Sancure® 878, Sancure® 815, Sancure® 1301, Sancure® 2715, Sancure® 2026, Sancure® 1818, Sancure® 853, Sancure® 830, Sancure® 825, Sancure® 776, Sancure® 850, Sancure® 12140, Sancure® 12619, Sancure® 835, Sancure® 843, Sancure® 898, Sancure® 899, Sancure® 1511, Sancure® 1514, Sancure® 1517, Sancure® 1591, Sancure® 2255, Sancure® 2260, Sancure® 2310, Sancure® 2725, Sancure® 12471, (all commercially available from available from Lubrizol Advanced Materials, Inc., Ohio), or combination thereof.

In some examples, the polyurethane can be cross-linked using a cross-linking agent. In example, the cross-linking agent can be a blocked polyisocyanate. In another example, the blocked polyisocyanate can be blocked using polyalkylene oxide units. In some examples, the blocking units on the blocked polyisocyanate can be removed by heating the blocked polyisocyanate to a temperature at or above the deblocking temperature of the blocked polyisocyanate in order to yield free isocyanate groups. An exemplary blocked polyisocyanate can include Bayhydur® VP LS 2306 (available from Bayer AG, Germany). In another example, the crosslinking can occur at trimethyloxysilane groups along the polyurethane chain. Hydrolysis can cause the trimethyloxysilane groups to crosslink and form a silesquioxane structure. In another example, the crosslinking can occur at acrylic functional groups along the polyurethane chain. Nucleophilic addition to an acrylate group by an acetoacetoxy functional group can allow for crosslinking on polyurethanes including acrylic functional groups. In other examples, the polyurethane polymer can be a self-crosslinked polyurethane. Self-crosslinked polyurethanes can be formed, in one example, by reacting an isocyanate with a polyol.

In another example, the polymeric binder can include an epoxy. The epoxy can be an alkyl epoxy resin, an alkyl aromatic epoxy resin, an aromatic epoxy resin, epoxy novolac resins, epoxy resin derivatives, or combination thereof. In some examples, the epoxy can include an epoxy functional resin having one, two, three, or more pendant epoxy moieties. Exemplary epoxy functional resins can include Ancarez® AR555 (commercially available from Air Products and Chemicals Inc., Pennsylvania), Ancarez® AR550, Epi-rez™ 3510W60, Epi-rez™ 3515W6, Epi-rez™ 3522W60 (all commercially available from Hexion, Tex.), or combination thereof. In some examples, the epoxy resin can be an aqueous dispersion of an epoxy resin. Exemplary commercially available aqueous dispersions of epoxy resins can include Araldite® PZ3901, Araldite® PZ3921, Araldite PZ3961-1, Araldite® PZ323 (commercially available from Huntsman International LLC, Texas), Waterpoxy® 1422 (commercially available from BASF, Germany), Ancarez® AR555 1422 (commercially available from Air Products and Chemicals, Inc., Pennsylvania), or combination thereof. In yet another example, the epoxy resin can include a polyglycidyl or polyoxirane resin.

In one example, the epoxy resin can be self-crosslinked. Self-crosslinked epoxy resins can include polyglycidyl resins, polyoxirane resins, or combination thereof. Polyglycidyl and polyoxirane resins can be self-crosslinked by a catalytic homopolymerization reaction of the oxirane functional group or by reacting with co-reactants such as polyfunctional amines, acids, acid anhydrides, phenols, alcohols, and/or thiols.

In other examples, the epoxy resin can be crosslinked by an epoxy resin hardener. Epoxy resin hardeners can be included in solid form, in a water emulsion, and/or in a solvent emulsion. The epoxy resins hardener, in one example, can include liquid aliphatic amine hardeners, cycloaliphatic amine hardeners, amine adducts, amine adducts with alcohols, amine adducts with phenols, amine adducts with alcohols and phenols, amine adducts with emulsifiers, ammine adducts with alcohols and emulsifiers, polyamines, polyfunctional polyamines, acids, acid anhydrides, phenols, alcohols, thiols, or combination thereof. Exemplary commercially available epoxy resin hardeners can include Anquawhite™ 100 (commercially available from Air Products and Chemicals Inc., Pennsylvania), Aradur® 3985 (commercially available from Huntsman International LLC, Texas), Epikure™ 8290-Y-60 (commercially available from Hexion, Tex.), or combination thereof.

In a further example, the polymeric binder can include a styrene maleic anhydride (SMA). In one example, the SMA can include NovaCote 2000® (Georgia-Pacific Chemicals LLC, Georgia). In another example, the styrene maleic anhydride can be combined with an amine terminated polyethylene oxide (PEO), amine terminated polypropylene oxide (PPO), copolymer thereof, or a combination thereof. In one example, combining a styrene maleic anhydride with an amine terminated PEO and/or PPO can strengthen the polymeric binder by crosslinking the acid carboxylate functionalities of the SMA to the amine moieties on the amine terminated PEO and/or PPO. The amine terminated PEO and/or PPO, in one example, can include amine moieties at one or both ends of the PEO and/or PPO chain, and/or as branched side chains on the PEO and/or PPO. In one example, utilizing an amine terminated PEO and/or PPO in combination with a SMA can allow for the user to retain the glossy features of the SMA while eliminating the brittle nature of SMA. Exemplary commercially vailable amine terminated PEO and/or PPO compounds can include Jeffamine® XTJ-500, Jeffamine® XTJ-502, and Jeffamine® XTJ D-2000 (all available from Huntsman International LLC, Texas). In some examples, a weight ratio of SMA to the amine terminated PEO and/or PPO can range from about 100:1 to about 2.5:1. In another, a weight ratio of the SMA to the amine terminated PEO and/or PPO can range from about 90:1 to about 10:1. In yet another example, a weight ratio of the SMA to the amine terminated PEO and/or PPO can range from about 75:1 to about 25:1.

In some examples, the glass transition temperature of the polymeric binder can be a factor in the performance of the printing media. In some examples, a lower Tg polymeric binder can keep the coated media soft. In one example, the Tg of the polymeric binder can range from −20° C. to 25° C. In another example, the Tg of the polymeric binder can range from about −15° C. to about 18° C. In some examples, multiple polymeric binders can be used and the multiple polymeric binders can include low Tg polymers and high Tg polymers.

The average molecular weight (Mw) of the polymeric binder can vary. In one example, the average molecular weight of the polymeric binder can range from 5,000 Mw to 200,000 Mw. In another example, the average molecular weight can vary from 10,000 Mw to about 200,000 Mw. In yet another example, the average molecular weight can vary from 20,000 Mw to 100,000 Mw. In a further example, the average molecular weight can vary from 100,000 Mw to 200,000 Mw.

In one example, the polymeric binder can have a weight average molecular weight from 5,000 Mw to 200,000 Mw and can include polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, polystyrene-butadiene emulsion, acrylonitrile butadiene latex, starch, gelatin, casein, soy protein polymer, carboxy-methyl cellulose, hydroxyethyl cellulose, acrylic emulsion, vinyl acetate emulsion, vinylidene chloride emulsion, polyester emulsion, polyvinyl pyrroilidene, polyvinyl alcohol, styrene butadiene emulsions, derivatives, or combination thereof.

The polymeric binder can be from about 10 wt % to about 95 wt % of the primary coating layer. In one example, the polymeric binder can range from about 45 wt % to about 94 wt % of the primary coating layer. In another example, the polymeric binder can range from about 10 wt % to about 80 wt % of the primary coating layer. In yet another example, the polymeric binder can range from about 20 wt % to about 88 wt % of the primary coating layer. In some examples, the polymeric binder can provide binding function to the filler particles to form a continuous layer and adhesion function between coating layers and substrate. In other examples, the polymeric binder can provide blocking functions to prevent the printing ink from penetrating into the z-direction of the fabric substrate. In some examples, the polymeric binder can allow for a high ink volume to be kept on the surface of fabric substrate and ensure a vivid image.

Turning now to the filler particles. The filler particles can include inorganic powder, inorganic mineral powder, organic powder, or combination thereof. In one example, the filler particle can be an inorganic powder with an amorphous or crystalline morphology. In another example, the filler particle can be an organic powder. In one example, the filler particles can include calcium carbonate, kaolin, talc, calcium sulfate, barium sulfate, titanium dioxide, zinc oxide, zinc sulfide, zinc carbonate, aluminum silicate, diatomite, calcium silicate, magnesium silicate, silica, amorphous silica, synthetic amorphous silica, colloidal silica, alumina, colloidal alumina, boehmite, pseudo-boehmite, aluminum hydroxide, aluminum, alumina trihydrate, ammonium polyphosphate, lithopone, zeolite, magnesium carbonate, magnesium calcium carbonate, magnesium hydroxide, magnesium, calcium, clay, calcium carbonate, polystyrene, polymethacrylates, polyacrylates, polyolefins, polyethylene, polypropylene, copolymers, or combination thereof. In one example, the filler particle can be alumina tryhydrate. In one example, the filler particles can include calcium carbonate. The calcium carbonate can be in the form of ground calcium carbonate, precipitated calcium carbonate, modified forms thereof, or combination thereof. In another example, the filler particles can include calcium carbonate and clay.

In some examples, the filler particles can exhibit flame retardant properties. In one example, a filler particle that exhibits flame retardant properties can serve as a smoke suppressant. In another example, a filler particle that exhibits flame retardant properties can delay ignition of the associated substance. For example, the filler particle having a flame retardant property and can produce water when heated, thereby diluting combustible gases and/or inhibiting oxygen from aiding in the combustion. In one example, a filler particle that exhibits flame retardant properties can include mineral powder, aluminum hydroxide, alumina trihydrate (commercially available as SpaceRite® from J. M. Huber Corp., USA), magnesium hydroxide, magnesium calcium carbonate (also known as huntite ($Mg_3Ca(CO_3)_4$)), poly-salt, ammonium polyphosphate, organochlorine, chlorendic acid derivative, chlorinated paraffin, organobromine, decabromodiphenyl ether (decaBDE), decabromodiphenyl ethane, polymeric brominated compound, brominated polystyrene, brominated carbonate oligomers (BCGs), brominated epoxy oligomers (BEOs), tetrabromophthalic anyhydride, tetrabromobisphenol A (TBBPA), hexabromocyclododecane (HBCD), organohalogenated compound, metal oxide, phosphorus containing composition, phosphorus and halogen containing composition, nitrogen containing composition, halogen containing composition, organophosphate, or a combination thereof.

The amount of filler particles in the primary coating layer can vary. In one example, the amount of filler particles can include from about 5 wt % to about 95 wt % of primary coating layer based on dry weight. In another example, the filler particles can range from 7 wt % to about 40 wt % of the primary coating layer. In yet another example, the filler particles can range from about 10 wt % to about 30 wt % of the primary coating layer. In a further example, the filer particles can range from 50 wt % to 95 wt % of the primary coating layer.

The ratio of the polymeric binder to the filler particle can also vary. In one example, the ratio of the polymeric binder to the filler particles can range from about 1:1 to about 1:9 by weight. In another example, the ratio of the polymeric binder to filler particles can be about 1:7 to about 1:9 by weight. In yet another example, the ratio of polymeric binder to filler particles can be about 1:4 to about 1:7 by weight. In a further example, the ratio of polymeric binder to filler particles can be about 1:2 to about 1:4 by weight.

In addition, the size of the filler particles can vary. In one example, the filler particles can have an average particle size ranging from about 0.1 µm to about 20 µm. In another example, the filler particles can have an average particle size ranging from about 0.2 µm to about 18 µm. In yet another example, the filler particles can have an average particle size ranging from about 0.5 µm to about 10 µm. In a further example, the filler particles can have an average particle size ranging from about 1 µm to about 5 µm. In yet another example, the filler particles can have an average particle size ranging from about 0.5 µm to about 2 µm.

A filler particle that has a lower particle size, and thus can include more surface area, can allow for a higher filler content. In one example, the filler particle can have an average surface area ranging from about 3 $m^2/g$ to about 5 $m^2/g$. In another example, the filler particle can have an average surface area of about 3 $m^2/g$. In yet another example, the filler particle can have an average surface area of about 4 $m^2/g$. In a further example, the filler particle can have an average surface area of about 5 $m^2/g$.

In some examples, the whiteness, brightness, and refractive index of the filler particles can affect the image quality. In one example, the filler particles can have a brightness equal to or greater than 98% Z. In another example, the filler particles can have a brightness equal to or greater than 99% Z. In some examples, the filler particles can have a refractive index of about 1.5 to 1.65, or about 1.57.

In another example, the filler particles can include from 5 wt % to about 95 wt % of the primary coating layer based on dry weight of the primary coating layer and can have an average particle size from 0.1 µm to 20 µm. The filler particles can be added to the primary coating layer in the form of a dry powder, dispersed in a slurry, or in the form of an aqueous suspension.

In some examples, primary coating layer can further include an additional flame retardant (in addition to filler that may or may not already exhibit flame retardant properties). The flame retardant can include a mineral powder, an organohalogenated compound, a polymeric brominated compound, a metal oxide and phosphorus containing composition, a phosphorus and halogen containing composition, a phosphorus continuing composition, a nitrogen containing composition, a halogen, an organophosphate, or a combination thereof.

In one example, the flame retardant can include a mineral powder. Exemplary mineral powders can include aluminum hydroxide, magnesium hydroxide, huntite (magnesium calcium carbonate), hydromangesite (hydrated magnesium carbonate), phosphorus, red phosphorus, boehmite (aluminum oxide hydroxide), boron compounds, or combination thereof.

In another example, the flame retardant can include an organohalogenated compound. Exemplary organohalogenated compounds can include organobromines, organochlorines, decabromodiphenyl ether, decabromodiphenyl ethane, or combination thereof. In some examples, the organohalogenated compound can be in a liquid or solid form.

In another example, the flame retardant can include a polymeric brominated compound. Exemplary polymeric brominated compounds can include brominated polystyrenes, brominated carbonate oligomers, brominated epoxy oligomers, tetrabromophthalic anhydride, tetrabromobisphenol A, hexabromocyclododecane, chlorendic acid, ethers of chlorendic acid, chlorinated paraffins, or combination thereof.

In yet another example, the flame retardant can include a metal and phosphorus containing composition. Example metal and phosphorus containing compositions can include aluminum diethylphosphinate, calcium diethylphosphinate, or combination thereof.

In a further example, the flame retardant can include a phosphorus and a halogen containing composition. Exemplary phosphorus and halogen containing compositions can include tris(2,3-dibromopropyl) phosphate, chlorinated organophosphates, tris(1,3-dichloro-2-propyl) phosphate, tetrekis(2-chloroethyl) dicloro-isopentyldiphosphate, tris (1,3-dichloroisopropyl) phosphate, tris(2-chloroisopropyl) phosphate, or combination thereof.

In another example, the flame retardant can include a phosphorus containing composition. Exemplary phosphorus containing compositions can include phosphates, phosphonates, phoshpinates, or combination thereof. In some examples, the phosphorus containing composition can have different oxidations states. In one example, the phosphorus containing composition can be a closed ring structure such as FR-102® (available from Shanghai Xusen Non-Halogen Smoke Suppressing Fire Retardants Co. Ltd, China) and Aflammit® (available from Thor, Germany). In another example, the phosphorus containing composition can be a water soluble phosphorus containing compound. Exemplary water soluble phosphorus containing compositions can include, a phosphonate ester with one or two, closed 4 to 6 member phosphorus containing ring structures. In one example, the water soluble phosphorus containing composition can be 5-ethyl-2-methyl-1,3,2,-dioxaphosphoranian-5-yl)methyl dimethyl phophonate P oxide (see Formula I).

Formula I

In another example, the water soluble phosphorus containing composition can be bis[(-ethyl-2-methyl-1,3,2-dioxaphosphorinan-5-yl)methyl] methyl phosphonate P,P'-dioxide (see Formula II).

Formula II

In another example, the flame retardant can include a nitrogen containing composition. Exemplary nitrogen containing compositions can include melamines, melamine derivatives, melamine, melamine cyanurate, melamine polyphosphate, melem (heptazine derivative), melon (heptazine derivative), or combination thereof.

In some examples, the flame retardant can be a combination of a phosphorus containing compound, a nitrogen containing compound, and/or a halogen. In one example, the flame retardant can include a phosphorus and a nitrogen containing composition. Exemplary phosphorus and nitrogen containing compositions can include ammonium polyphosphate (APP), poly 4,4-diaminodiphenyl methane spirocyclic pentaerythritol bisphosphonate (PDSPB), 1,4-di (diethoxy thiophosphamide bezene (DTPAB), or combination thereof.

In another example, the flame retardant can include an organophosphate. The organophosphate can include: aliphatic phosphate; aliphatic phosphonate; aromatic phosphonate; aliphatic organophosphate; aromatic organophosphate; polymeric organophosphate with 2 or 3 oxygen atoms attached to the central phosphorus; compositions satisfying formulas III, IV, and V below; or combination thereof.

Formula III

Formula IV

Formula V

In Formulas III, IV, and V $R^1$, $R^2$, and $R^3$ are individually chosen from $C_1$-$C_{12}$ branched or straight alkyl chains, aryl chains, 5 bisphosphate, halogens, or combination thereof. In yet another example, the organophosphate can include tris (1,3-dichloroisopropyl) phosphate, tris (2-chloroisopropyl) phosphate, dimethyl phosphonate, diethyl phosphonate, dimethyl propyl phosphonate, diethyl N,N-bis-(2-hydroxyetyl) aminomethyl phosphonate, oligomeric chloroalkyl phosphates, chloroalkyl phosphates, aryl phosphates, the like, or combination thereof.

The flame retardant can include from about 1 wt % to about 50 wt % of the primary coating. In one example, the flame retardant can include from about 5 wt % to about 40 wt % of the primary coating. In another example, the flame retardant can include from about 10 wt % to 30 wt % of the primary coating. In yet another example, the flare retardant can include from 15 wt % to about 25 wt % of the primary coating. In one example, the flame retardant can include a mineral powder, organohalogenated compound, a polymeric brominated compound, a metal and phosphorus containing composition, a phosphorus containing composition, a nitrogen containing composition, a halogen, an organophosphate, or combination thereof and from 1 wt % to 50 wt % of the primary coating layer based on dry weight of the primary coating layer.

When the primary coating layer includes a flame retardant, the ratio of filler particles to flame retardant can vary. In one example, the ratio of filler particles to flame retardant by weight can range from about 1:99 to 99:1, from about 1:50 to 50:1, or from about 1:20 to about 20:1. In certain specific examples, the ratio of filler particles to flame retardant can range from about 2:1 to about 35:1. In another example, the ratio of filler particles to flame retardant can range from about 3:1 to about 20:1 parts by dry weight. In yet another example, the ratio of filler particles to flame retardant can range from about 5:1 to about 15:1 parts by dry weight.

Figure 3:
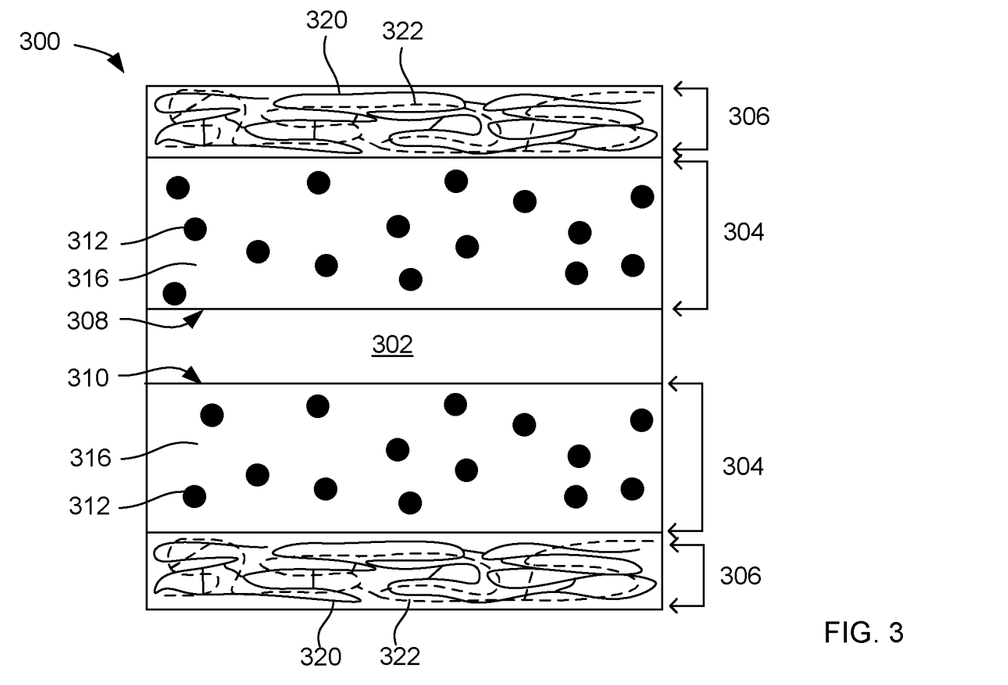
FIG. 3 schematically displays a side view of an example fabric print medium with two printing sides in accordance with the present disclosure.
Figure 4:
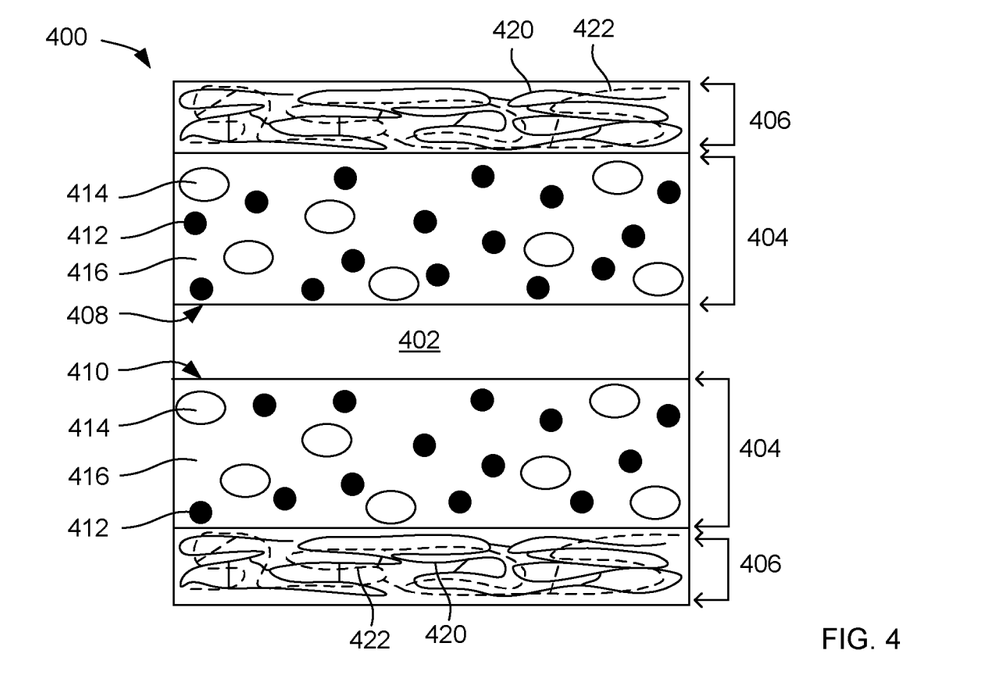
FIG. 4 schematically displays a side view of an example fabric print medium with two printing sides in accordance with present disclosure.

The primary coating layer can be applied to the first side (as shown in FIGS. 1 and 2) or both sides of the fabric substrate (as shown in FIGS. 3 and 4 hereinafter). When applied to the first side and the second side, the composition of primary coating can be the same or can be different on each side. The primary coating layer can be applied to fabric substrate at a variety of coat weights. In one example, the primary coating layer can be applied to the fabric substrate at a dry coat weight range from about 5 gsm to about 200 gsm. In one example, the primary coating layer can be applied to the fabric substrate a dry coat weight ranging from about 30 gsm to about 50 gsm. In yet another example, the primary coating layer can be applied to the fabric substrate at a coating weight from about 50 gsm to about 150 gsm. Also, as mentioned, in one example, after the primary coating layer can be foamed by being injected with air prior to application to the fabric substrate to generate air bubbles therein and to provide air voids within the primary coating layer.

Referring more specifically to the secondary coating layer, this layer can include a first crosslinked polymeric network and a second crosslinked polymeric network. The first and second crosslinked polymeric networks can include a polyacrylate, polyurethane, vinyl-urethane, acrylic urethane, polyurethane-arcylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, derivative thereof, or combination thereof. The polyacrylate, polyurethane, vinyl-urethane, acrylic urethane, polyurethane-arcylic, polyether polyurethane, polyester polyurethane, polycaprolactam polyurethane, polyether polyurethane, alkyl epoxy resin, epoxy novolac resin, polyglycidyl resin, polyoxirane resin, polyamine, and styrene maleic anhydride can be as described above. In some examples, the first and second crosslinked polymeric networks can be different polymers.

In some examples, the first crosslinked polymeric network can be crosslinked to itself. In another example, the first crosslinked polymeric network can be crosslinked to itself and to the second crosslinked polymeric network. In one example, the second crosslinked polymeric network can be crosslinked to itself. When the first crosslinked polymeric network and the second crosslinked polymeric network are not crosslinked to one another, they can be entangled together, or in some examples, can be layered onto one another, even though they may still be present in the same coating layer.

The first and second crosslinked polymeric networks can be present in the secondary coating layer in a variety of relative weight ratios. In one example, the first and second crosslinked polymeric networks can collectively range from about 80 wt % to about 100 wt % of the secondary coating layer. In another example, the first and second crosslinked polymeric networks can collectively range from about 80 wt % to about 99 wt % of the secondary coating layer. In yet another example, the first and second crosslinked polymeric networks can collectively range from about 85 wt % to about 95 wt % of the secondary coating layer. In a further example, the first and second crosslinked polymeric networks can collectively range from about 85 wt % to about 93 wt % of the secondary coating layer. In some examples, the first and second crosslinked polymeric networks can be present in equal amounts. In other examples, the first and second crosslinked polymeric networks can be present in different amounts.

In some examples, the secondary coating layer can further include a wax. In one example, the wax can be a synthetic wax, a petroleum wax, a vegetable wax, an animal wax, a mineral wax, a paraffin wax, a microcrystalline wax, a polyethylene wax, or combination thereof. In another example, the wax can include a petroleum wax. In yet another example, the wax can include a high melt polyethylene wax. In some examples, a high melt wax can soften at temperatures of 130° C. or more. In another example, a high melt wax can soften at temperatures of 150° C. or more. In a further example, the wax can include a synthetic wax. Exemplary commercially available waxes can include Slip-Ayd® SL100, Slip-Ayd® SL177, Slip-Ayd® SL18, Slip-Ayd® SL404, Slip-Ayd® SL417, Slip-Ayd® SL425, Slip-Ayd® SL4709, Slip-Ayd® SL506, Slip-Ayd® SL508, Slip-Ayd® SL50, Slip-Ayd® SL523, Slip-Ayd® SL530, Slip-Ayd® SL551, Slip-Ayd® SL555, Slip-Ayd® SL600, Slip-Ayd® SL620, Slip-Ayd® SL700, Slip-Ayd® SL78, Slip-Ayd® SL94 (all Slip-Ayd® are available from Elementis Specialties Inc., New Jersey), Acculin® 400, Acculin® 500, Acculin® 600, Acculin® 655, Acculin® 725, Acculin® 850, Acculin® 1000, Acculin® 2000 (available from The International Group Inc., Delaware), or combination thereof.

In one example, when the wax is present, it can range from about 1 wt % to about 20 wt % of the secondary coating layer. In another example, the wax can range from about 3 wt % to about 20 wt % of the secondary coating layer. In yet another example, the wax can range from about 5 wt % to about 15 wt % of the secondary coating layer. In a further example, the wax can range from about 7 wt % to about 15 wt % of the secondary coating layer.

In one example, the primary coating can be applied to the fabric substrate at a dry coat weight of from 5 gsm to 300 gsm and the secondary coating layer be applied over the primary coating layer at a dry coat weight of from 0.5 gsm to 50 gsm. In another example, the primary coating can be applied to the fabric substrate at a dry coat weight of from 30 gsm to 50 gsm and the secondary coating layer be applied over the primary coating layer at a dry coat weight of from 3 gsm to 15 gsm. In yet another example, the primary coating can be applied to the fabric substrate at a dry coat weight of from 10 gsm to 150 gsm and the secondary coating layer be applied over the primary coating layer at a dry coat weight of from 5 gsm to 75 gsm. In some examples, the primary coating layer can be two or more times thicker than the secondary coating layer. In another example, the primary coating layer can be three or more times thicker than the secondary coating layer.

As mentioned, the fabric print medium can be coated on one side, e.g., with one printing side, or on both sides, e.g., with two printing sides. The same or similar thickness, dry coating weight ranges, formulations, etc. apply to these two sided coating examples as well. In accordance with this, FIG. 3 schematically displays one example of a fabric print medium with two printing sides 300. The fabric print medium with two printing sides can include a fabric substrate 302, a primary coating layer 304, and a secondary coating layer 306 (note that these are present on both sides of the fabric substrate). The fabric substrate can have a first side 308 and a second side 310. The primary coating layer can include a polymeric binder 316 and filler particles 312. Also, in FIG. 3 the secondary coating layer includes a first crosslinked network 320 and a second crosslinked network 322.

In another example, schematically FIG. 4 displays another example of a fabric print medium with two printing sides 400, which can include a fabric substrate 402, a primary coating layer 404, and a secondary coating layer 406. The fabric substrate can have a first side 408 and a second side 410. The primary coating layer can include a polymeric binder 416, filler particles 412, and air voids 414. The air voids can be generated as a primary coating composition used to generate the layer may be injected with air prior to application to the fabric substrate to generate air bubbles therein and to provide air voids within the primary coating layer. The air can be injected in primary coating before it is applied on one or both sides of the fabric substrate. Also, in FIG. 4 the secondary coating layer includes a first crosslinked network 420 and a second crosslinked network 422.

Figure 5:
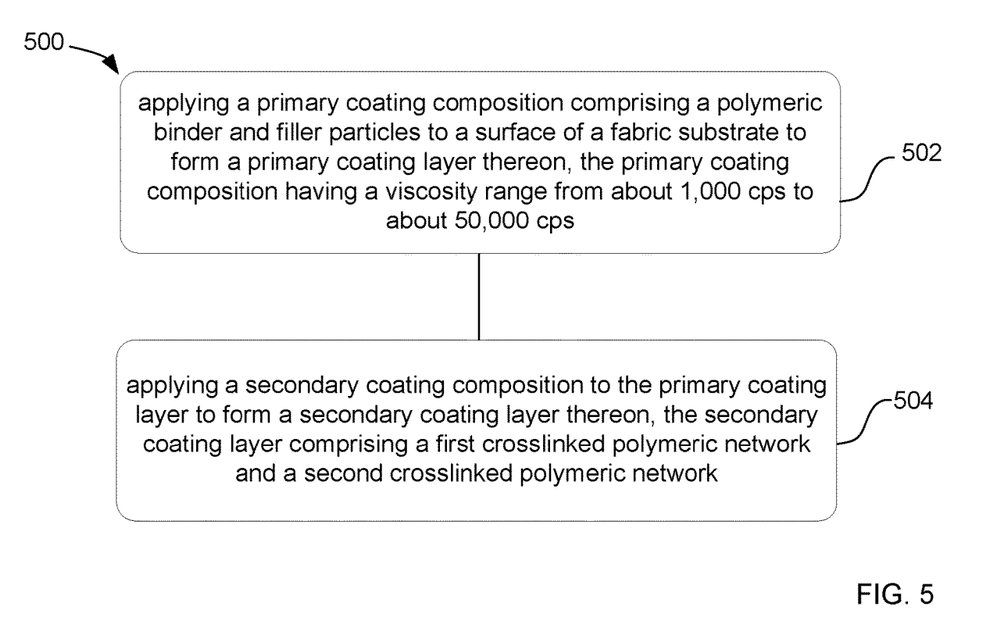
FIG. 5 schematically displays an example method of preparing a fabric medium in accordance with the present disclosure.

Further presented herein is a method of preparing a fabric print medium. In one example, the method 500 can include applying 502 a primary coating composition including a polymeric binder and filler particles to a surface of a fabric substrate to form a primary coating layer thereon. The primary coating composition can have a viscosity range from about 1,000 cps to about 25,000 cps. An additional step can include applying 504 a secondary coating composition to the primary coating layer to form a secondary coating layer thereon. The secondary coating layer can include a first crosslinked polymeric network and a second crosslinked polymeric network.

In one example, the method can further include injecting air into the primary coating composition to form a primary coating layer with air voids. In one example, a density of air can be injected ranging from about 0.3 $g/cm^3$ to about 0.8 $g/m^3$ prior to applying the primary coating composition to the first side to generate and retain air voids in the primary coating layer after drying. In another example, the air can be injected into the primary coating layer at a density ranging from about 0.35 $g/cm^3$ to about 0.7 $g/cm^3$. In a further example, the air can be injected into the primary coating layer at a density ranging from about 0.4 $g/cm^3$ to about 0.55 $g/cm^3$. In some examples, the method can further include applying pressure using pressure nips or off-line calender to the fabric media after applying the primary coating layer. When the fabric print medium has two printing sides, the fabric substrate can simply be turned over and the process can be repeated on the other side of the fabric substrate.

In one example, the step of applying the primary coating composition and the secondary coating composition (to form respective layers) can include a floating knife process, a knife on roll mechanism process, or a transfer coating process. In one example, the floating knife process can include stretching the fabric to form an even uniform surface. The floating knife process can further include transporting the fabric under a stationary knife blade. In another example, the step of applying the primary and secondary coating layer can include applying a foam coating. The foam coating can be applied using a knife-on-the roll mechanism. In one example, the knife-on-the roll mechanism can be followed by passing the fabric through calendering pressure nips. The calendering can be carried out either at room temperature or at an elevated temperature and/or pressure. In one example, the elevated temperature can range from 40° C. to 100° C. In another example, the elevated pressure can range from about 100 psi to about 5,000 psi. In yet another example, the coating process can include transferring a coating layer (spread and formed on a release substrate) to be laminated onto the fabric or previously applied layer.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, the term "fabric" is used to describe any textile structure. A fabric can include textiles in the filament form, cloth materials, and finished articles. Fabrics can be woven, non-woven, knitted, tufted, etc., and can be natural or synthetic. As used herein, fabrics exclude paper.

"Warp-knit fabric" refers to loops in a fabric structure that is formed in a longitudinal fabric direction.

"Weft knit fabric" refers to loops of one row of fabric formed in a horizontal fabric direction.

As used herein, a plurality of items, structural elements, compositional elements, and/or materials may be presented in a common list for convenience. However, these lists can be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 0.1 wt % to about 20 wt % should be interpreted to include not only the explicitly recited limits of about 0.1 wt % and about 20 wt %, but also to include individual weights such as 0.5 wt %, 1 wt %, 2 wt %, 11 wt %, 14 wt %, and sub-ranges such as 10 wt % to 20 wt %, 5 wt % to 15 wt %, etc.

As a further note, in the present disclosure, it is noted that when discussing the fabric print media or the method of preparing the fabric print media, these discussions can be considered applicable to each of these examples, whether or not they are explicitly discussed in the context of that example. Thus, for example, in discussing details about the fabric print medium per se, such discussion also refers to the method, and vice versa.

EXAMPLES

The following examples illustrate a fabric print medium. However, it is to be understood that the following are only exemplary or illustrative of the application of the materials and methods disclosed herein. Numerous modifications and alternative methods may be devised by those skilled in the art without departing from the spirit and scope of the present disclosure. The appended claims are intended to cover such modifications and arrangements.

Example 1

Preparation of a Fabric Print Medium

Four fabric print media were prepared. The fabric substrate used for each medium was 100% woven polyester having a dry weight of 137 gsm. Primary coating compositions and a comparative were prepared according to the formulations provided in Table 1.

TABLE 1

Primary Coating Layer Formulation

| Component | Type | P1 (parts by weight) | P2 (parts by weight) | P3 (parts by weight) | P4 (comparative) (parts by weight) |
|---|---|---|---|---|---|
| Edolan ® AB | Polymeric binder | 100 | 100 | 100 | 100 |
| Hydrocarb ® 60 | Calcium carbonate | 5 | 100 | | 100 |
| Spacerite ® S3 | White hydrated alumina (aluminum trihydroxide) | 100 | | 100 | |
| JLS PNP1-C | Aluminum polyphosphate | 10 | | | |
| Tegowet ® 510 | Wetting Agent | 1 | 1 | 1 | 1 |
| Aflammit ® MSG | Flame Retardant | 0 | 25 | 5 | |

Endolan ® AB is available from Tanatex Chemicals, Netherlands; Hydrocarb ® 60 is available from Omya, North America; Spacerite ® S3 is available from J. M. Huber Corp., USA; JLS PNP1-C is available from JLS Chemical Inc., China; Tegowet ® 510 is available from Evonik Industries, GmbH, Germany; and Aflammit MSG is available from THOR, Germany.

The primary coating compositions from Table 1 was applied as primary coating layers to fabric substrates P1, P2, P3, and P4. Each of the primary coating compositions was mixed by hand and coated onto the respective fabric substrates using a Mathis Lab Coater Model LTE-S (Werner Mathis, AG Switzerland). The primary coating layer was dried at 120° C. for 5 min in a hot air oven attached to the coater. The samples were further subjected a calendering process to smooth out the surface at about 54.4° F. and 2,000 PSI.

The secondary coating layers was prepared according to the compositions formulations provided in Table 2 and Table 3, which were subsequently applied in various combinations to P1, P2, P3, and P4, which already had a primary coating layer applied.

TABLE 2

Secondary Coating Layer

| Composition | Type | Amount (parts by weight) |
|---|---|---|
| Byk-Dynwet ® 800 | Wetting Agent | 1 |
| BYK ®-024 | Defoamer | 0.5 |
| Araldite ® PZ 3901 | Epoxy resin | 100 |
| Aradur ® 3985 | Epoxy resin hardener | 100 |
| Sancure ® 2016 | Polyurethane | 58 |
| Sancure ® 4010 | Polyurethane | 35 |

Byk-Dynwet ® 800, and Byk ® 024 are available from BYK Additives & Instruments, Georgia; Araldite ® PZ 3901 and Aradur ® 3985 are available from Huntsman International LLC Texas; Sancure ® 2016 and 4010 are available from Lubrizol Advanced Materials, Inc., Ohio

TABLE 3

Secondary Coating Layer Including a Wax

| Composition | Type | Amount (parts by weight) |
|---|---|---|
| Byk-Dynwet ® 800 | Wetting Agent | 1 |
| BYK ®-024 | Defoamer | 0.5 |
| Araldite ® PZ 3901 | Epoxy resin | 100 |
| Aradur ® 3985 | Epoxy resin hardener | 100 |
| Sancure ® 2016 | Polyurethane | 58 |
| Sancure ® 4010 | Polyurethane | 35 |
| Slip-Ayd ® SL 100 | Wax | 5 |

Byk-Dynwet ® 800, and Byk ® 024 are available from BYK Additives & Instruments, Georgia; Araldite ® PZ 3901 and Aradur ® 3985 are available from Huntsman International LLC Texas; Sancure ® 2016 and 4010 are available from Lubrizol Advanced Materials, Inc., Ohio; Slip-Ayd ® 100 is available from Elementis Specialties Inc, New Jersey.

The secondary coating composition was applied directly on top of the primary coating layer to form a secondary coating layer using a lab ECS blade coater made by Euclid Coating System Inc, USA with a coat weight of 10 gsm. The secondary coating layer was then dried in Fisher Scientific™ Isotemp™ Standard Lab Ovens at 120° C. for 10 min.

Example 2

Printing Test

Fabric substrates were coated using the formulations from Example 1 (P1, P2, P3, and P4) as applied to a polyester fabric substrate. The formulations were applied to the fabric substrates at different coat weights as set forth in Table 4.

TABLE 4

Experimental Fabric Mediums

Primary Coating Layer

| | Base coating ID | Coat weight (gsm) | Secondary coating Layer* |
|---|---|---|---|
| Exp. 1 | P1 | 50 gsm | Applied at 10 gsm |
| Exp. 2 | P2 | 50 gsm | Applied at 10 gsm |
| Exp. 3 | P3 | 50 gsm | Applied at 10 gsm |
| Exp. 4 (comparative) | None | none | Applied at 10 gsm |
| Exp. 5 (comparative) | P4 | 50 gsm | Applied at 10 gsm |
| Exp. 6 (comparative) | P1 | 50 gsm | None |
| Exp. 7 (comparative) | P1 | 5 gsm | Applied at 10 gsm |
| Exp. 8 | P1 | 50 gsm | Wax Formulation Applied at 10 gsm |

*Unless specifically designated as including wax, the secondary coating layer includes the formulation from Table 2 (e.g., Exp. 8 includes wax as in Table 3).

The same images were printed on the experimental mediums using a HP® DesignJet L360 Printer equipped with HP 789 ink cartridge (Hewlett Packard Inc, California). The printer was set with a heating zone temperature at about 50° C., a cure zone temperature at about 110° C., and an air flow at about 15%. The printed fabric mediums were tested for image quality, ink adhesion, folding creasing test, water fastness Image quality—Image quality tests were conducted by measuring color the color gamut, using XYZ color patches. The color gamut was measured on Macbeth® TD904 device (Micro Precision Test Equipment, California). The image quality of the prints related to bleed sharpness, blur, noise/graininess, banding, mottle, patchiness, line quality, and text quality, were evaluated visually from the printed samples using a scale of 1-5 (with 1 being the worst and 5 being the best).

Ink adhesion—Ink adhesion tests were carried out for dry rub resistance and resistance to damage due to folding or creasing of printed images. Specifically, rub resistance testing was carried out using an abrasion scrub tester. A serial of weight up to 800 g was loaded on the test header_of the Automatic Scrtch Tester made by Taber Industries USA. The test tip was made of acrylic resin with crock cloth. The test cycle speed was 25 cm/min and 5 cycles were carried out for each sample at an 8 inch length for each cycle. The test probe was used in a dry rub mode. The damage on the image was evaluated visually using a scale of 1-5 (with 1 being the worst and 5 being the best).

Folding/Creasing Test—A folding/creasing test was conducted which included first printing a test target sized 8 inches×8 inches, 100% of all colors (e.g., a composite black image). Next, the target was folded several times in both MD and CMD directions with the image size facing inwards, followed by placing a 1 kg/2.2 lb weight on top of the folded image for 20 minutes. After 20 minutes, the target was unfolded and examined front and back for crease marks. The damage on the image was evaluated visually using a scale of 1-5 (with 1 being the worst and 5 being the best).

Water Fastness—Water fastness was evaluated using water drip and water immersion techniques. The water drip test was conducted by applying deionized water on printed samples and observing the water damage on the image. The protocol for the water drip test was as follows:

3 inch×3 inch squares were printed, one square for each colorant to be tested (100% density), making sure there was 2-3 inches of white/unprinted material around each printed patch;

a lab eye-dropper tool was used to dispense 6-7 drops of deionized water into the center of each square;

the process was repeated immediately for each square and then it was allowed to dry on flat table for several hours to one day;

after drying the images were examined for permanent halos/circles forming around the printed patches.

Hallowing or circles indicated flowing of additive/surface treatment agents in the material which was considered unfavorable. The protocol for the water immersion test is as follows:

the printed images were immersed in water until completely soaked;

the images were allowed to dry;

after drying the damage on the image was evaluated visually using a scale of 1-5 (with 1 being the worst and 5 being the best).

Fire resistance—Fire retardancy or resistance was evaluated complying with FR Stanford NFPA (National Fire Protection Association) 701: Standard Methods of Fire Tests for Flame Propagation of Textiles and Films.

The results of the tests are provided in Table 5 below.

TABLE 5

Printing image and durability results

| ID | Gamut volume | Print Quality | Folding | Scratch resistance | Water resistance | Flame retardance |
|---|---|---|---|---|---|---|
| Exp. 1 | 812,000 | 5 | 4+ | 5 | 5 | Pass |
| Exp. 2 | 725,000 | 4 | 4 | 5 | 5 | Pass |
| Exp. 3 | 805,000 | 5 | 5 | 5 | 5 | Pass |
| Exp. 4 (comparative) | 415,000 | 1 | 5 | 4 | 5 | Fail |
| Exp. 5 (comparative) | 737,000 | 4+ | 4+ | 5 | 5 | Fail |
| Exp. 6 (comparative) | 694,000 | 4 | 5 | 1 | 2 | Pass |
| Exp. 7 (comparative) | 420,000 | 1 | 5 | 3 | 4 | Fail |
| Exp. 8 | 808,500 | 5 | 5 | 5 | 5− | Pass |

The experimental test results indicated that the coated fabric mediums including formulations P1, P2, and P3 when applied at 50 gsm to the fabric substrate performed well for print quality, folding, scratch resistance, water resistance, and flame retardance. When the primary coating layer was applied at a coat weight of 5 gsm the print quality was poor (Exp. 7). This indicates that the primary coating layer can be applied at a coat weight greater than 5 gsm in order to have the desired print quality. The test also indicate that when a wax is included in the secondary coating layer the folding performance improved but the water resistance declined (Compare Exp. 1 and Exp. 8).

While the disclosure has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. A fabric print medium, comprising:
   a fabric substrate including a first side and a second side;
   a primary coating layer applied to the first side of the fabric substrate at a thickness from 2 μm to 250 μm with a dry coat weight ranging from about 5 gsm to about 200 gsm, the primary coating layer comprising a polymeric binder and filler particles; and
   a secondary coating layer applied to the primary coating layer at a thickness from 1 μm to 50 μm with a dry coat weight ranging from 0.5 gsm to 50 gsm, the secondary coating layer comprising a first crosslinked polymeric network and a second crosslinked polymeric network, wherein the first crosslinked polymeric network and the second crosslinked polymeric network collectively make up from 80 wt % to 100 wt % of the secondary coating layer, wherein the primary coating layer is two or more times thicker than the secondary coating layer.

2. The fabric print medium of claim 1, wherein the fabric substrate comprises wool, cotton, silk, linen, jute, flax, hemp, rayon, corn starch, tapioca, sugarcane, polyvinyl chloride, polyester, polyamide, polyimide, polyacrylic, polyacrylic polypropylene, polyethylene, polyurethane, polystyrene, polyaramid, polytetrafluoroethylene, polyethylene terephthalate, fiberglass, polytrimethylene, polycarbonate, polyester terephthalate, polybutylene terephthalate, or a combination thereof.

3. The fabric print medium of claim 1, wherein the polymeric binder has a weight average molecular weight from 5,000 Mw to 200,000 Mw and comprises a polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, polystyrene-butadiene emulsion, acrylonitrile butadiene latex, starch, gelatin, casein, soy protein polymer, carboxy-methyl cellulose, hydroxyethyl cellulose, acrylic emulsion, vinyl acetate emulsion, vinylidene chloride emulsion, polyester emulsion, polyvinylpyrroilidene, polyvinyl alcohol, styrene butadiene emulsions, a derivative thereof, or a combination thereof.

4. The fabric print medium of claim 1, wherein the primary coating layer further comprises a flame retardant and the flame retardant comprises mineral powder, organohalogenated compound, a polymeric brominated compound, metal and phosphorus containing composition, or combination thereof, and wherein the flame retardant comprises from 1 wt % to 50 wt % of the primary coating layer based on dry weight of the primary coating layer.

5. The fabric print medium of claim 1, wherein the filler particles exhibit flame retardant properties and comprises from 5 wt % to about 95 wt % of the primary coating layer based on dry weight of the primary coating layer, wherein the filler particles have an average particle size from 0.1 μm to 20 μm, and wherein the filler particles include mineral powder, aluminum hydroxide, alumina trihydrate, magnesium hydroxide, magnesium calcium carbonate, poly-salt, ammonium polyphosphate, organochlorine, chlorendic acid derivative, chlorinated paraffin, organobromine, decabromodiphenyl ether, decabromodiphenyl ethane, polymeric brominated compound, brominated polystyrene, brominated carbonate oligomer, brominated epoxy oligomer, tetrabromophthalic anyhydride, tetrabromobisphenol A, hexabromocyclododecane, organohalogenated compound, metal oxide, phosphorus containing composition, phosphorus and halogen containing composition, nitrogen containing composition, halogen containing composition, organophosphate, or combination thereof.

6. The fabric print medium of claim 1, wherein the filler particles include alumina trihydrate.

7. The fabric print medium of claim 1, wherein the primary coating layer includes air voids within the primary coating layer generated by injecting a primary coating composition that is used to form the primary coating layer with air bubbles prior to application to the fabric substrate.

8. The fabric print medium of claim 1, wherein the first crosslinked polymeric network and the second crosslinked polymeric network are different and independently comprises polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, a derivative thereof, or a combination thereof.

9. The fabric print medium of claim 1, wherein the first crosslinked polymeric network and the second crosslinked polymeric network are further crosslinked to each other.

10. The fabric print medium of claim 1, wherein the secondary coating layer further comprises from 1 wt % to 20 wt % of a wax and the wax comprises synthetic wax, petroleum wax, vegetable wax, animal wax, mineral wax, paraffin wax, microcrystalline wax, polyethylene wax, or a combination thereof.

11. A method of preparing the fabric print medium of claim 1, comprising:
    applying a primary coating composition to the first side of the fabric substrate to form the primary coating layer thereon, the primary coating composition having a viscosity range from about 1,000 cps to about 50,000 cps; and
    applying a secondary coating composition to the primary coating layer to form the secondary coating layer thereon.

12. The method of claim 11, further comprising injecting air into the primary coating composition a density ranging from 0.3 g/cm$^3$ to 0.8 g/cm$^3$ prior to applying the primary coating composition to the first side to generate and retain air voids in the primary coating layer after drying.

13. The method of claim 11, further comprising applying pressure using pressure nips or off-line calender to the fabric media after applying the primary coating composition, and wherein the step of applying the primary coating composition and the secondary coating composition comprises a floating knife process, a knife on roll mechanism process, or a transfer coating process.

14. A fabric print medium, comprising:
a fabric substrate comprising a first side and a second side;
a primary coating layer applied to the first side and the second side of the fabric substrate at an independent thickness from 2 μm to 250 μm with an independent dry coat weight ranging from about 5 gsm to about 200 gsm, the primary coating layer independently comprising a polymeric binder and filler particles; and
a secondary coating layer applied to the primary coating layer on both the first side and the second side at an independent thickness from 1 μm to 50 μm with an independent dry coat weight ranging from 0.5 gsm to 50 gsm, the secondary coating layer independently comprising a first crosslinked polymeric network and a second crosslinked polymeric network, wherein the first crosslinked polymeric network and the second crosslinked polymeric network collectively make up from 80 wt % to 100 wt % of the secondary coating layer,
wherein the primary coating layer is two or more times thicker than the secondary coating layer on both sides.

15. The fabric print medium of claim 14, wherein the primary coating layer on both sides includes air voids generated by injecting a primary coating composition that is used to form the primary coating layers with air bubbles prior to application to the fabric substrate.

16. The fabric print medium of claim 1, wherein the first crosslinked polymeric network and the second crosslinked polymeric network collectively make up from 85 wt % to 99 wt % of the secondary coating layer.

17. The fabric print medium of claim 1, wherein the first crosslinked polymeric network is an epoxy polymer network and the second crosslinked polymeric network is a polyurethane polymer network.

18. The fabric print medium of claim 10, wherein the secondary coating layer consists of the first crosslinked polymeric network, the second crosslinked polymeric network, the wax, a wetting agent, and a defoamer.

* * * * *